United States Patent
Rosenthal et al.

(10) Patent No.: US 9,527,778 B2
(45) Date of Patent: Dec. 27, 2016

(54) METHOD OF HYDROPONICALLY GROWING PLANTS

(71) Applicant: Florikan E.S.A. LLC, Sarasota, FL (US)

(72) Inventors: Edward Rosenthal, Sarasota, FL (US); Eric Morris Rosenthal, Sarasota, FL (US)

(*) Notice: Subject to any disclaimer, the term of this patent is extended or adjusted under 35 U.S.C. 154(b) by 0 days.

(21) Appl. No.: 15/096,072

(22) Filed: Apr. 11, 2016

(65) Prior Publication Data

US 2016/0221886 A1    Aug. 4, 2016

Related U.S. Application Data

(60) Provisional application No. 62/316,732, filed on Apr. 1, 2016.

(51) Int. Cl.
| | | |
|---|---|---|
| *A01G 31/02* | (2006.01) | |
| *A01N 25/00* | (2006.01) | |
| *A01N 3/02* | (2006.01) | |
| *C05B 17/00* | (2006.01) | |
| *C05G 3/00* | (2006.01) | |
| *A01G 31/00* | (2006.01) | |

(52) U.S. Cl.
CPC .............. *C05B 17/00* (2013.01); *A01G 31/00* (2013.01); *C05G 3/0029* (2013.01); *A01G 2031/006* (2013.01)

(58) Field of Classification Search
USPC ............... 47/62 N, 62 R, 59 R, 79, DIG. 10, 58.1 SC, 47/58.1 R, 56; 71/64.07, 64.11; 504/101, 113, 504/116.1
See application file for complete search history.

(56) References Cited

U.S. PATENT DOCUMENTS

| | | | | |
|---|---|---|---|---|
| 4,123,248 A | * | 10/1978 | Drake | C03C 4/0035 424/411 |
| 7,267,707 B2 | * | 9/2007 | Rosenthal | C05G 3/0029 71/28 |
| 7,320,724 B2 | * | 1/2008 | Rosenthal | C05G 3/0005 71/31 |
| 2011/0098177 A1 | * | 4/2011 | Abou-Nemeh | A01N 37/36 504/101 |
| 2015/0156973 A1 | * | 6/2015 | Prinster | A01G 9/102 47/65.7 |

OTHER PUBLICATIONS

How to Grow Marijuana.com, "NPK Fertilizer Ratio", Best nutrients for marijuana Feb. 9, 2014 [retrieved from internet Jun. 14, 2016] 4 pages, http://web.archive.org/web/20140209141521/http://howtogrowmarijuana.com/NPK-fertilizer-ratio/.*
Edward Rosenthal, Florikan, Facebook, Jul. 27, 2014 [retrieved from internet Aug. 29, 2016] https://www.facebook.com/Florikan/posts/635474319885201.*
Bedding Plants and CRFs, Neil S. Mattson et al, Aug. 13, 2012, 7 pages, [retrieved from internet on Aug. 29, 2016] http://www.greenhousegrower.com/production/crop-inputs/fertilization/bedding-plants-and-crfs/.*
www.florikan.com/literature.html, Literature, Florikote NPK 18-6-12 Golf/Turf, Feb. 27, 2013, 2 pages [retrieved from internet Aug. 30, 2016].*
Florikan 14-4-14 nano [retrieved on Oct. 25, 2016 from https://issuu.com/florikanesa/docs/14-4-14-nano-print] dated Mar. 8, 2016, 4 pages.*

* cited by examiner

*Primary Examiner* — Andrea Valenti
(74) *Attorney, Agent, or Firm* — Eugene C. Rzucidlo

(57) ABSTRACT

A method of hydroponic growing of plants comprising hydroponically growing the plants in the presence of a controlled release hydroponic fertilizer composition. The hydroponic fertilizer composition comprises a polymerically coated controlled release fertilization nutrient formulation wherein the coated formulation has an N-P-K ratio wherein the N-K ratio is substantially balanced and further comprises micronutrients and optionally chelated iron.

12 Claims, No Drawings

METHOD OF HYDROPONICALLY GROWING PLANTS

RELATED PATENT APPLICATIONS

This application is a continuation of provisional patent application Ser. No. 62/316,732.

BACKGROUND OF THE INVENTION

Field of the Invention

The invention relates generally to methods of hydroponic cultivation and fertilizer compositions for hydroponic cultivation, and more specifically to a method for increasing plant yields while decreasing the associated costs of time, labor growing space, fertilizer, fumigation, water, etc., and also decreasing the associated environmental impact.

Description of the Prior Art

The commercial production of plants and plant material for consumption is plagued with many difficulties associated with natural botanical characteristics and the environment in which the plants are grown. Proper horticultural practices to minimize these difficulties and maximize plant growth and production are necessary to ensure commercially viable production.

Commercial farms have evolved to grow plants in organized rows. The rows help facilitate the planting, feeding, trimming, feeding, watering, maintenance and harvesting of the plants or food products grown by the plants. Conventional growing practices often utilize flood-type irrigation techniques and mass spraying of chemicals used to fumigate and fertilize.

Flood irrigation and mass spraying, besides being wasteful of water and chemical resources, has the potential to damage surface soils and both ground water and surface water sources. Irrigating floodwater applied to fields promotes erosion and promotes run-off of fertilizers and pesticides into water sources. In arid environments flood irrigation often leads to soil mineralization associated with the buildup of surface salts. Flood irrigation also creates large swings over time in the amount of moisture in the soil, which stresses the plants.

Agricultural fields, especially those in continuous use, year after year, are usually infested with harmful nematodes that attack the roots of plants that are planted. Development of nematode resistant plant varieties and crop rotation have lessened the problem of nematode infestation to a limited extent. A field is typically fumigated before planting with a substance such as methyl bromide in an effort to kill the nematodes, but this also has achieved limited success since the harmful nematodes reside approximately 12 inches below the surface of the soil. The use of methyl bromide is also being severely restricted or banned completely in some regions due to adverse environmental effects associated with its use. Methyl bromide and other fumigants also kill many of the organisms in the soil that are beneficial to plants.

Furthermore, in traditional flood irrigation a significant percentage of water applied to a field is lost either through evaporation to the air or migration below the effective root zone of the plants. The downward migration of water also has the negative consequence of carrying fertilizers, pesticides and insecticides into the groundwater. This technique wastes water resources, as does more advanced sprinkler techniques, although to a lesser extent.

Thus traditional cultivation methods in soil are wasteful of resources that are not focused on plant production, and has a harsh impact on the environment.

Hydroponic cultivation has been previously practiced to grow vegetables, flowers and other annual crops that do not develop a large root system. However, the use of hydroponic cultivation for perennial plants that typically develop large root systems, such as trees, vines, bushes and shrubs, has not been used. It was previously thought that the hydroponic cultivation of such plants would require large planting containers for the root systems to develop, which would not be cost effective.

Hydroponics, by definition, is a method of growing plants in a water based, nutrient rich solution. Hydroponics does not use soil, instead the root system is supported using an inert medium such as perlite, rock wool, clay pellets, peat moss, or vermiculite. The basic premise behind hydroponics is to allow the plants roots to come in direct contact with the nutrient solution, while also having access to oxygen, which is essential for proper growth.

Growing with hydroponics comes with many advantages, the biggest of which is a greatly increased rate of growth of plants. With the proper setup, plants can mature up to 25% faster and produce up to 30% more than the same plants grown in soil.

Plants can grow bigger and faster because they will not have to work as hard to obtain nutrients. Even a small root system will provide the plant exactly what it needs, so the plant will focus more on growing upstairs instead of expanding the root system downstairs.

All of this is possible through careful control of the nutrient solution and pH levels. A hydroponic system uses less water than soil based plants because the system is enclosed, which results in less evaporation. Hydroponics is better for the environment because it reduces waste and pollution from soil runoff.

Hydroponics is an excellent choice for all types of growers. It is a great choice because it gives you the ability to meticulously control the variables that effect how well your plants grow. A fine-tuned hydroponic system can easily surpass a soil based system in plant quality and amount of produce yielded.

All of this is made possible by the relationship of a plant with its growing medium. It isn't soil that plants need—it's the reserves of nutrients and moisture contained in the soil, as well as the support the soil renders the plant. Any growing medium will give adequate support. And by raising plants in a sterile growing medium in which there are no reserves of nutrients, you can be sure that every plant gets the precise amount of water and nutrients it needs. Soil often tends to leach water and nutrients away from plants, making the application of correct amounts of fertilizer very difficult. In hydroponics, the necessary nutrients are usually dissolved in water, and this resulting solution is applied to the plants in exact doses at prescribed intervals.

The right timing of nutrients takes into consideration the growth pattern of the crop and, therefore, natural changes in nutrient demand during the season. Crop development begins slowing from seed germination or transplanting, then increases through fruiting, and finally slows down at maturation. Anticipating changes in growth and nutrient demand is important so that fertilizer application can be timed to meet the needs of growth. A good example of timing of nitrogen and potassium fertilization to meet changes in crop development.

The current method of hydroponic vertical farming, i.e., growing plants, for example vegetables or pharmaceutical medicinal plants, in pots and hanging baskets, use a liquid formulation of 2-2-4 or 0-6-6 or plus calcium magnesium are very low nutrient charges to protect the plant roots from high soluble salts developing in the soil medium in a closed loop minimum leaching growing environment.

This low nutrient liquid requires multiple applications over the 2-3 months to 6 months grow period.

SUMMARY OF THE INVENTION

Fertilizers or nutrients are required in plant crop production systems including hydroponic growing systems. Supplying needed nutrients for plant crop production involves attention to four major fertilization factors: right rate, right source, right placement, and right timing. Attention to these factors provides adequate nutrition for crop production while minimizing the risk of loss of nutrients to the environment. The 4Rs are important components of nutrient best management practices.

The object of the present invention is to provide a controlled-release fertilizer (CRF) which is urea-free and which provides adequate nutrients to plants at the proper time in hydroponic growing systems. The present invention can simultaneously deliver more than one needed nutrient to hydroponic growing systems at the proper time.

It is a further object of the present invention to provide a method of hydroponic vertical farming, i.e., growing plants, for example vegetables or pharmaceutical medicinal plants using a controlled-release fertilizer (CRF) which is urea-free and which provides adequate nutrients to the plants at the proper time in hydroponic growing systems. The present invention can simultaneously deliver more than one needed nutrient to hydroponic growing systems at the proper time.

It is a still further object of the present invention to provide a controlled release fertilizer formulation for hydroponic plant growing including hydroponic growing of vegetables and medicinal plants which ensures the right timing of nutrients and takes into consideration the growth pattern of the crop.

Prior and current method of conventional hydroponic vertical farming are currently conducted with liquid fertilization methods.

In a study by NASA, it was determined to use hydroponic technology to grow vegetables in space for astronauts in preparation for a sustainable food vegetable production system for long range space flight. NASA funded research in conventional hydroponic growing system. However, the intent by NASA scientists was to determine if replacement of liquid feed in hydroponics was possible. This was crucial as on the ISS in micro gravity conditions liquid feed was not an option as the liquid floats in micro gravity.

NASA funded research indicated that a controlled release fertilizer that a polyolefin polymer coated controlled release formulation of 18-6-8 with macro and micro nutrients called Nutricote was superior to other product types in hydroponic vegetable systems for use in space for the controlled release of the macro and micro nutrients that were measured as the nutrients were diffused by reverse osmosis over 300 days in water at five temperatures. This polyolefin product was superior in producing a steady linear release at temperatures from 20° C. to 30° C.

The NASA funded research conclusion spurred new and novel research and development by the present inventors for the development of a CRF fertilizer which can be used in growing methods using hydroponic vertical farming systems on earth. The present inventors have developed a different and totally new controlled release formulation (CRF), which is a N-K substantially balanced formulation and which is a urea-free formulation, and which is useful in methods of hydroponic growing of plants such as for example vegetables or medical *cannabis*. A preferred embodiment of the present CRF is a 3-1-3 N-P-K formulation which is urea-free and which would be ideal for methods of hydroponic vertical vegetable farming as well as the farming of pharmaceutical type plants such as medical *cannabis* in hydroponic growing conditions. The present invention most notably provides a substantially balanced (i.e., equal or similar) N to K ratio which is controlled release.

The present invention relates a method of hydroponically growing plants such as vegetables or medical *cannabis* using a CRF which is comprised of a polymer coated controlled release technology formulation which is urea free and which has a substantially balanced N to K ratio which has been specifically formulated for use in hydroponics plant growing systems.

The present invention further relates to a polymer coated controlled release technology formulation which is urea free and which has a substantially balanced N to K ratio which has been specifically formulated for use in hydroponics plant growing systems.

The present controlled release hydroponic fertilizer composition for use in a method of hydroponic growing comprises a polymerically coated controlled release composition having the N-P-K ratio wherein the N-K ratio is substantially balanced (i.e., equal or substantially equal, i.e. similar) and wherein the P ratio is minimal. The present polymerically coated controlled release composition useful in a method of hydroponic growing can have the N-P-K ratio analysis of, for example, 3-1-3, and preferably 14-4-14. The important feature of the present controlled release hydroponic fertilizer composition is that the N-K ratio is substantially balanced (i.e., equal or substantially equal, i.e., similar) and wherein the P ratio of the hydroponic fertilizer composition is minimal.

The present invention relates to a specialized polymer coated nutrient formulation for controlled release fertilization in vertical farming hydroponics which is efficient and effective and which can be applied as a reduced labor fertilization treatment. With nitrogen as one of the principle limiting factors in hydroponic vertical farming in pots and hanging baskets, a formulation comprising readily available sources of N (Nitrogen) and K (Potassium) was developed and wherein the present CRF has a substantially balanced N to K ratio. The present controlled release fertilization nutrient formulation having an N-P-K ratio wherein the N-K ratio is substantially balanced, preferably a 3-1-3 N-P-K ratio, more preferably 14-4-14, includes macro and micro nutrients at ratios which are balanced for plant growth without high soluble salts build up and reduced plant stretch due to excessive fast release nitrogen, and optionally also contains chelated iron.

The potassium compounds include potassium chloride, potassium nitrate, potassium sulfate, monopotassium phosphate, dipotassium phosphate, tetra potassium pyrophosphate, and potassium metaphosphate.

The primary fertilizers may be supplemented with trace elements such as copper, iron, manganese, zinc, cobalt, molybdenum, or boron. Suitable salts are, for example, sulphates, nitrates, chlorides, molybdates or borates.

The fertilizer may further include macronutrients including sulfur, calcium and magnesium and/or micronutrients including boron, copper, iron, manganese, molybdenum and zinc.

The present controlled release fertilizer useful in methods of hydroponic growing of plants is a polymer coated nonurea nitrogen formulation which contains compounded nitrate nitrogen and ammoniacal nitrogen forms as well as potassium forms from potassium sulfate The readily available forms of N from nitrate nitrogen and ammoniacal nitrogen forms and K from sulfate of potassium forms when optionally mixed with chelated iron from iron EDTA as well as sulfate forms of magnesium, manganese, zinc, copper, and molybdenum when coated in a polyurethane or polyolefin polymer matrix with precision release characteristics comprise a superior formulation for methods of hydroponic vertical farming, for example, growing vegetables and pharmaceutical medicinal plants in pots and hanging baskets. The present balanced formulation has an N-P-K ratio wherein the N-K ratio is substantially balanced and is formulated with minor nutrients and chelated iron and is highly effective as compared to current conventionally used methods of liquid feeding in hydroponics.

The present controlled release fertilizer with balanced N-P-K wherein the N-K ratio is substantially balanced controlled release when the fertilizer formulation is coated with polyolefin or polyurethane is a superior controlled release fertilizer (CRF) for methods in hydroponic farming of plants, including, e.g., hydroponic vegetable farming or hydroponic growing of medical cannabis.

The granular core material for use herein may contain any type of fertilizer core compound(s). Known chemical fertilizers including potassium nitrate, potassium sulphate, urea, ammonium nitrate, monopotassium sulfate, ammonium phosphate, or fertilizers obtained from compounding a mixture of these fertilizers can be used. In a preferred embodiment, the fertilizers contain micronutrients or trace elements. The coating material applied can be based on any kind of material, thermoplastic or thermoset, which is able to form a uniform continuous polymer film. Typical such films include, for example, polyolefins and polyurethanes and are known in this art area.

The coating and blending technology developed in the present invention useful in the method of hydroponic plant growing also includes the blending of a controlled release fertilizer with balanced N-P-K wherein the N-K ratio is substantially balanced with the preferred N-P-K ratio analysis of 3-1-3, more preferably 14-4-14 with different staged day controlled releases of nutrients. As an example in one embodiment a 100-day can be blended with a 180-day controlled release fertilizer at varying blending ratios to achieve maximum and continuous plant yield.

A 50/50 blend of 100 days and 180 days present CRF is one optimum blended product which can provide an excellent yield in the first three months then a second excellent yield in the second three months.

This multiple crop yield in a method of hydroponic growing of plants with one application of a controlled release fertilizer had not been achieved until the development of the present controlled release nitrate nitrogen, potassium sulfate compound of present controlled release fertilization nutrient formulation having the N-P-K ratio wherein the N-K ratio is substantially balanced, preferably a 3-1-3 N-P-K ratio, more preferably 14-4-14. The present formulation optionally contains a high level of 0.80 chelated iron and other micro nutrient all 100% polymer coated and which then can be blended in multiple release types example 100 day and 180 day at varying blend ratios one to one being an optimum blended product lasting six months in hydroponic vertical farming conditions.

The present invention provides an improved method for the growing of medical cannabis. The term "hydroponic" literally translates as "water work" and refers to a specific method of metabolism where a plant absorbs all nutrients through a soil-less medium. Advances in hydro-technology have allowed growers to create growing beds out of everything from plastic baskets to blocks of rockwool insulation.

In order to thrive, a marijuana (Cannabis) plant only needs: water, light, oxygen, nutrients, and carbon-dioxide. Plopping a seed down in a plot of dirt is the tried and true way to meet these demands, but that doesn't mean it's necessarily the most efficient method. The main principle behind hydroponic farming is the idea that a plant which does not have to expend energy searching for nutrients in soil will instead allocate those resources to fruit and leaf production. Rather than rely on fertilizers ("nutrient solutions") to ensure that plants have the nutrients they need to thrive in a plot of soil, the present invention provides a controlled release fertilizer especially useful in a method of hydroponically growing of medical cannabis. The present controlled release fertilization nutrient formulation has the N-P-K ratio wherein the N-K ratio is substantially balanced, preferably a 3-1-3 N-P-K ratio, more preferably 14-4-14, and is directly applicable to the medium in which the medical cannabis plants are grown.

More specifically, the present invention provides an improved method of growing medical cannabis hydroponically wherein the improvement comprises applying the present controlled release fertilization nutrient formulation having the N-P-K ratio wherein the N-K ratio is substantially balanced, preferably a 3-1-3 N-P-K ratio, more preferably 14-4-14, controlled release fertilizer to the medium in which the medical cannabis plants are grown and allowing the medical cannabis plants to grow to maturity without the need for any further need to apply nutrients.

DETAILED DESCRIPTION OF THE INVENTION

The present invention relates to polymer coated controlled release technology for useful in hydroponic plant growing systems and in methods of hydroponic growing of plants such as vegetables or medical cannabis. The present dual controlled release polymer technology useful in hydroponics plant growing systems comprises a controlled release fertilization nutrient formulation having the N-P-K ratio wherein the N-K ratio is substantially balanced, preferably a 3-1-3 N-P-K ratio, more preferably 14-4-14. The present controlled release fertilizers may be formulated with, for example, a polyurethane or a polyolefin controlled release technology coating in the preparation of the formulation of the present controlled release fertilization nutrient formulation having the N-P-K ratio wherein the N-K ratio is substantially balanced, preferably a 3-1-3 N-P-K ratio, more preferably 14-4-14, controlled release fertilizers. The polyurethane and polyolefin coated controlled release fertilizers work equally in hydroponics plant growing systems and both function equally well as controlled release fertilizers in water and high temperatures.

In the process of making the present controlled release fertilizer, the polymer coatings can be applied to the surface of fertilizer granules surface by various methods including, e.g. pouring, hydraulic spraying or pneumatic atomized spraying. The presence of a polymeric coating on the present controlled release fertilizers allows for a rather uniform and consistent nutrient release, provided that the barrier.

Both polymeric coated controlled release fertilizers provide controlled release formulations of a controlled release fertilization nutrient formulation having the N-P-K ratio wherein the N-K ratio is substantially balanced, preferably a 3-1-3 N-P-K ratio, more preferably 14-4-14, that are particularly useful in hydroponic vertical farming for vegetables, flowering plants, and medical plants such as *cannabis*.

The present invention further comprises a new novel controlled release fertilizer formulation specifically a controlled release fertilization nutrient formulation having the N-P-K ratio wherein the N-K ratio is substantially balanced, preferably a 3-1-3 N-P-K ratio, more preferably 14-4-14, which also contains extra chelated iron to enable a boost of photosynthesis.

The present controlled release fertilization nutrient formulation having the N-P-K ratio wherein the N-K ratio is substantially balanced, preferably a 3-1-3 N-P-K ratio, more preferably 14-4-14, formulation has proved successful in hydroponic vegetable farming research trials and commercial growing indicating a further promise to change hydroponics to more efficient method of production.

The present controlled release fertilization nutrient formulation having the N-P-K ratio wherein the N-K ratio is substantially balanced, preferably a 3-1-3 N-P-K ratio, more preferably 14-4-14, ratio concept and product formulation was developed by the present inventors as a substrate for polymer coating. In one embodiment the formulation having the N-P-K ratio wherein the N-K ratio is substantially balanced, preferably a 3-1-3 N-P-K ratio, more preferably 14-4-14, is coated with a polyolefin and the other is a polyurethane coated material. The present controlled release fertilizers for hydroponic plant growing systems can also be blends of various release types of the present controlled release fertilization nutrient formulations having a N-P-K ratio wherein the N-K ratio is substantially balanced, preferably a 3-1-3 N-P-K ratio, more preferably 14-4-14, at varying blending ratios. The present controlled release fertilizer provides a novel use of controlled release fertilization in hydroponic vertical farming replacing liquid mineral salts solutions or water soluble fertilizer. With the present invention, only one application of the present CRF per crop is needed for the entire crop replacing the prior multiple liquid applications applied thru an injector As hydroponics vertical farming is a closed loop system with minimum leaching the amount of fertilizer salts must be at a minimum. Controlled release fertilizer was never expected to be able to feed at such low levels to be safe for the plants roots and while growing healthy plants.

The present invention further relates to method of using a controlled release fertilization nutrient formulation having the N-P-K ratio wherein the N-K ratio is substantially balanced, preferably a 3-1-3 N-P-K ratio, more preferably 14-4-14, in a hydroponic vertical farming system. The present method uses a release fertilization nutrient formulation having the N-P-K ratio wherein the N-K ratio is substantially balanced, preferably a 3-1-3 N-P-K ratio, more preferably 14-4-14, which is controlled release having a 100% coating in a proprietary polymer resin. The present invention features a novel use of a formulation having low nitrogen and low phosphate with high potassium for flowering.

The present controlled release fertilization nutrient formulation for a hydroponic farming method having the N-P-K ratio wherein the N-K ratio is substantially balanced, preferably a 3-1-3 N-P-K ratio, more preferably 14-4-14, which is controlled release, also features a unique high level of chelated iron (Fe) also controlled release to build photosynthesis without need of additional iron.

The release type proprietary blending of multiple release types of controlled release fertilizers of the present controlled release fertilization nutrient formulations having the N-P-K ratio wherein the N-K ratio is substantially balanced, preferably a 3-1-3 N-P-K ratio, more preferably 14-4-14 further comprises the blending into one product of at least 2 or more of various release types at varying blend ratios is also novel to application in methods of vertical hydroponic farming of vegetables or medical *cannabis*.

As an example, one can blend one to one parts of 100-day release type of present controlled release fertilization nutrient formulation having the N-P-K ratio wherein the N-K ratio is substantially balanced, preferably a 3-1-3 N-P-K ratio, more preferably 14-4-14, with 180 days release type of the present controlled release fertilization nutrient formulation at a 50/50 blend offers a six month controlled release fertilizer program but with two staged release components whereby the 100 day may accelerate root growth and stem strength while the 180 day will provide longer term maintenance feed and promote flowering.

The present controlled release fertilization nutrient formulation having the N-P-K ratio wherein the N-K ratio is substantially balanced, preferably a 3-1-3 N-P-K ratio, more preferably 14-4-14, is useful in and the method of using the present controlled release fertilizer in two major production crop types, vegetables for salad use and *cannabis* for medicinal pharmaceutical use (where legal).

Florikan, the assignee of the present application, has dual proprietary polymer coating controlled release technology available to Florikan. The proprietary polyurethane polymer coating and a polyolefin controlled release technology coating of present controlled release fertilization nutrient formulation having the N-P-K ratio wherein the N-K ratio is substantially balanced, preferably a 3-1-3 N-P-K ratio, more preferably 14-4-14, work equally well in hydroponics.

Both polymers have successfully coated the present controlled release fertilization nutrient formulation having the N-P-K ratio wherein the N-K ratio is substantially balanced, preferably a 3-1-3 N-P-K ratio, more preferably 14-4-14 This fertilizer has been found by the present inventors to be important to hydroponic vertical farming for vegetables flowering plants and medical *cannabis*.

This novel approach is one application of CRF per crop needs for the entire crop replacing multiple liquid applications applied through an injector.

As hydroponics vertical farming is a closed loop system with minimum leaching the amount of fertilizer salts must be at a minimum therefore controlled release fertilizer was never expected to be able to feed at such low levels to be safe for the plants roots and while growing healthy plants.

The present invention comprises the first use of a controlled release fertilization nutrient formulation having the N-P-K ratio wherein the N-K ratio is substantially balanced, preferably a 3-1-3 N-P-K ratio, more preferably 14-4-14, in vertical farming. The present controlled release fertilization nutrient formulation is a complete fertilizer 100 percent readily available forms of nutrients while 100 percent coated in a proprietary polymer resin. The present controlled release fertilization nutrient formulation having the N-P-K ratio wherein the N-K ratio is substantially balanced, preferably a 3-1-3 N-P-K ratio, more preferably 14-4-14, features novel use of low nitrogen and low phosphate with high potassium for flowering. The present controlled release fertilization nutrient formulation having the N-P-K ratio wherein the N-K ratio is substantially balanced, preferably a 3-1-3 N-P-K ratio, more preferably 14-4-14, also features a unique high level of chelated iron (Fe) also controlled release to build photosynthesis without need of additional iron The present controlled release fertilization nutrient formulation having the N-P-K ratio wherein the N-K ratio is substantially balanced, preferably a 3-1-3 N-P-K ratio, more preferably 14-4-14, developed by in the present invention is unique to hydroponic vertical farming growing.

The blending into one product of at least 2 or more of various release types at varying blend ratios is novel to application in vertical hydroponic farming. As an example the blending of one to one parts of 100-day release type with a 180 days release type at a 50/50 blend offers a six month controlled release fertilizer program but with two staged release components whereby the 100 day may accelerate root growth and stem strength while the 180 day will provide longer term maintenance feed and promote flowering There are many opportunities of CRF as one application in vertical hydroponic farming system replacing multiple liquid applications which are the result of the present controlled release fertilization nutrient formulation having the N-P-K ratio wherein the N-K ratio is substantially balanced, preferably a 3-1-3 N-P-K ratio, more preferably 14-4-14, is blended micronutrients and/or with chelated iron which had never been used before in vertical hydroponic farming. The blending of multiple release types of present controlled release fertilization nutrient formulations at varying rates and treatments can provide maximum efficiency in vertical hydroponic farming.

As an example of the present invention CRF and present invention method, Sweetgrass Farms (Dr. Jim Demler) in Sarasota is a participating collaborator grower of the NASA selected veggie varieties. In this vertical hydroponic growing experiment only one application of the present CRF is applied by incorporation into the coco peat media.

From seed in roughly 30-45 days of production Dr. Demler and his growers have grown successfully a healthy crop of Tokyo Bekana cabbage. This is indicative of the success of Vertical Hydroponic farming at Sweetgrass Farms of the NASA Veggie cabbage variety selected called Tokyo Bekana and grown with only one application of Florikan CRF the N-P-K ratio analysis of 3-1-3, preferably 14-4-14, blend with a substantially balanced (i.e., equal or similar) N to K ratio which is controlled release of one to one ratio T 100 blend with T 180. The cabbage treatment was only water applied after fertilizer incorporated at 11 lbs. per yard of coco peat.

The present invention also comprises a method of propagation from seed phase using the balanced N-K CRF but with a significantly reduced size guide number (SGN) size for incorporation into very small seedling cells and trays.

In the embodiment prior to the growing of the plants a propagation phase can be carried out with a prescreened and rescreened controlled release polyurethane 90-day fertilizer is utilized in the propagation phase. This is prior to and is accomplished earlier than the production phase in the vertical hanging baskets hydroponic farming or in pots in vertical hydroponics farming. A propagation blend is of a one to one ratio of N to K or substantially equivalent 1-1 ratio where the P is minimal such as, for example 3-1-3, or 14-4-14 or substantially similar ratios, such as, for example, 10-2-10 12-2-12 13-3-13 or where the N or K may be adjusted by a percentage point up or down. The propagation phase from seed is carried out using, for example, a 14-4-14 CRF in small SGN size called a NANO size blend of specific prescreened and re-screened fertilizer to have a consistent SGN smaller size called NANO and in a release rate of 90 days or 2-3 months at a formulation of 14-4-14 in for example 90-day release with a fully polyurethane polymer coated blended product including micro nutrients in the 14-4-14. The 90-day blend is incorporated into a cubic yard of coco peat or similar high CEC media at a rate of 2 lbs. of the 14-4-14-90 day NANO at 2 lbs. per cubic which produce superior propagation from seed.

The seedlings once propagated are then transplanted into the one to one 14-4-14 T 100//180 blend of polyurethane or polyolefin controlled release fertilizer for the three to six months of production.

A further embodiment of the present invention involving the propagation portion of the vertical hydroponic system and method of the present invention the quality control procedure is an important factor in the success of the present balanced ratio N-K CRF product system in vertical farming hydroponics. Through a screening and re-screening quality control process the Nano size of the present propagation prill is produced.

This QA process involves taking regular industrial size prills commonly available of an SGN 250 to 400 with an average of 325 SGN. The screening and re-screening efforts results in prills with SGN of MN/NANO 125 to 175 with an average of 150 and a larger interim SGN MD 175 to 250 with an average of 212.

Both smaller SGN sizes are ideally suited for propagation and incorporation into small size seedling trays and cells and offer the propagation system an opportunity to successfully use controlled release fertilizer for the first time. The present invention further comprises release characteristic quality control of the present balanced N-K ratio CRF.

As an example, the polyurethane coating is sprayed in a coating production vessel to achieve a 90-day release, it is important that in propagation as in any such small cell planting that the release rate of the nutrients be as exact and precise as possible. To affect this quality control after the polyurethane coating is applied, every manufactured batch is held in quarantine for seven (7 days) as a sample is taken from every batch and placed in distilled water in an incubator at 100° F. Nutrient release is measured against a high low standard of conductivity in water the release measured in conductivity is checked at day 1-3 and 7 and only the batches passing QC testing are released for blending for shipment.

The screening to result in the Nano SGN size and the retained sample quality control nutrient release measurement of in the case of propagation is a 90-day release ensure a consistent controlled release product is produced at 100 percent of the time for a 90 day CRF product for propagation.

In Florikan controlled release embodiments the same quality control principal of retained samples is used on 100% of all polyurethane coated product produced by Florikan regardless of the SGN size therefore all of Florikan controlled release fertilizer products have a uniform consistent release characteristics. This is important in closed loop non-leaching growing environments such as vertical hydroponic farming where soluble salts must be as low as possible to minimize damage to plant roots.

This quality control as defined above is another reason that the present polyurethane or polyolefin polymer coated products useful in the method of hydroponic growing of plants such as vegetables and medical *cannabis* are successful with the present formulation with the NK of same or similar ratio of N to K of one to one with low P and lower N with a balanced K are proving success in the novel use of CRF in hydroponic vertical farming.

It should be understood that the above description is only representative of illustrative embodiments and examples. For the convenience of the reader, the above description has focused on a limited number of representative examples of all possible embodiments, examples that teach the principles of the invention. The description has not attempted to exhaustively enumerate all possible variations or even combinations of those variations described. That alternate embodiments may not have been presented for a specific portion of the invention, or that further undescribed alternate embodiments may be available for a portion, is not to be considered a disclaimer of those alternate embodiments. One of ordinary skill will appreciate that many of those undescribed embodiments, involve differences in technology and materials rather than differences in the application of the principles of the invention. Accordingly, the invention is not intended to be limited to less than the scope set forth in the following claims and equivalents.

What is claimed:

1. In a method of hydroponic growing of plants, the improvement comprising placing the plants in a hydroponic growing medium making one application of a controlled release hydroponic fertilizer composition and allowing the plants to grow to maturity without the need for any further application of nutrients; wherein the controlled release hydroponic fertilizer composition comprises a urea-free polymerically coated controlled release fertilization formulation and micronutrients and wherein the polymeric coating is polyolefin or polyurethane and the urea-free polymerically coated controlled release fertilization nutrient formulation is capable of releasing nutrients at a proper time and a proper amount during plant growth to maturity, wherein the coated formulation comprises a 3-1-3 N-P-K ratio or a 14-4-14 N-P-K ratio, micronutrients, and chelated iron; and wherein the formulation having prills with SGN of MN/NANO 125 to 175.

2. The method of hydroponic growing according to claim 1, wherein the plants being grown are vegetables.

3. The method of hydroponic growing according to claim 1, which comprises growing medical *Cannabis*.

4. The method of hydroponic growing according to claim 1, wherein the coated formulation comprises a blend of at least one type of controlled release characteristic formulation with at least one of a second type of controlled release characteristic formulation.

5. In a method of propagation of plants, the improvement comprising propagation phase growing from seed or cutting of a plant comprising placing the seed or cutting in a propagation medium making a single application of a controlled release hydroponic fertilizer to the propagation medium and, growing the seed or cutting in the presence of the coated formulation to a seedling without the need for any further application of nutrients to the propagation medium; wherein the controlled release fertilizer composition comprises a urea-free polymerically coated controlled release fertilization formulation and micronutrients and wherein the polymeric coating is polyolefin or polyurethane and the urea-free polymerically coated controlled release fertilization nutrient formulation is capable of releasing nutrients at a proper time and a proper amount during propagation, wherein the coated formulation comprises a 3-1-3 N-P-K ratio or a 14-4-14 N-P-K ratio, micronutrients, and chelated iron; and wherein the formulation having prills with SGN of MN/NANO 125 to 175.

6. The method of hydroponic growing according to claim 5, wherein the plants being grown are vegetables.

7. The method of hydroponic growing according to claim 5, which comprises growing medical *Cannabis*.

8. The method of hydroponic growing according to claim 5, wherein the coated formulation comprises a blend of at least one type of controlled release characteristic formulation with at least one of a second type of controlled release characteristic formulation.

9. In a method of hydroponic growing of plants the method comprising: propagation phase growing from seed or cutting of a plant comprising placing the seed or cutting in a propagation medium making a single application of a controlled release hydroponic fertilizer to the propagation medium and growing the seed or cutting in the presence of the coated formulation to a seedling without the need for any further application of nutrients to the propagation medium; wherein the controlled release fertilizer composition comprises a urea-free polymerically coated controlled release fertilization formulation and micronutrients and wherein the polymeric coating is polyolefin or polyurethane and the urea-free polymerically coated controlled release fertilization nutrient formulation is capable of releasing nutrients at a proper time and a proper amount during propagation; placing the seedlings in a hydroponic growing medium, making one application of a controlled release hydroponic fertilizer composition and allowing the seedlings to grow to maturity without the need for any further application of nutrients; wherein the controlled release hydroponic fertilizer composition comprises a urea-free polymerically coated controlled release fertilization formulation and micronutrients and wherein the polymeric coating is polyolefin or polyurethane and the urea-free polymerically coated controlled release fertilization nutrient formulation is capable of releasing nutrients at a proper time and a proper amount during plant growth to maturity, wherein the coated formulation comprises a 3-1-3 N-P-K ratio or a 14-4-14 N-P-K ratio, micronutrients, and chelated iron; and wherein the formulation having prills with SGN of MN/NANO 125 to 175.

10. The method of hydroponic growing according to claim 9, wherein the plants being grown are vegetables.

11. The method of hydroponic growing according to claim 9, which comprises growing medical *Cannabis*.

12. The method of hydroponic growing according to claim 9, wherein the coated formulation comprises a blend of at least one type of controlled release characteristic formulation with at least one of a second type of controlled release characteristic formulation.

* * * * *